(12) United States Patent
Alger et al.

(10) Patent No.: US 10,091,305 B2
(45) Date of Patent: Oct. 2, 2018

(54) DISCONNECT PROTECTION FOR COMMAND-LINE REMOTE TERMINALS

(71) Applicant: International Business Machines Corporation, Armonk, NY (US)

(72) Inventors: Joshua A. Alger, Raleigh, NC (US);
Alan R. Buss, Raleigh, NC (US);
James D. Creasman, Apex, NC (US);
Jeffrey R. Hoy, Southern Pines, NC (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 14/573,205

(22) Filed: Dec. 17, 2014

(65) Prior Publication Data

US 2016/0182647 A1    Jun. 23, 2016

(51) Int. Cl.
*G06F 15/16*    (2006.01)
*H04L 29/08*    (2006.01)

(52) U.S. Cl.
CPC ............ *H04L 67/142* (2013.01); *H04L 67/16* (2013.01)

(58) Field of Classification Search
None
See application file for complete search history.

(56) References Cited

U.S. PATENT DOCUMENTS

| 8,266,637 | B2 | 9/2012 | Schmieder et al. |
| 8,271,777 | B2 * | 9/2012 | Borisov ................. H04L 67/14 709/227 |
| 8,762,540 | B2 | 6/2014 | Hochmuth et al. |

(Continued)

FOREIGN PATENT DOCUMENTS

EP    2244420 A1    10/2010

OTHER PUBLICATIONS

"Getting ssh to execute a command in the background on target machine", Stackoverflow.com, Mar. 20, 2013 [retreieved on Feb. 10, 2017]. Retrieved from the Internet: <URL:http://stackoverflow.com/questions/29142/getting-ssh-to-execute-a-command-in-the-background-on-target-machine>.*

(Continued)

*Primary Examiner* — S M Rahman
*Assistant Examiner* — Dae Kim
(74) *Attorney, Agent, or Firm* — Scully, Scott, Murphy & Presser, P.C.; Jeffrey S. LaBaw, Esq.

(57) ABSTRACT

Disconnection protection for command-line remote terminal may be provided. A command-line remote terminal session may be created at the first computer for interacting with the second computer. A command entered in the command-line remote terminal session may be intercepted. A disconnect protection may be injected into the command. The disconnect protection may comprise at least redirecting output from the command into a session log file. The output of the command may be tracked to simulate the command as an active process in the command-line remote terminal session at the first computer. Responsive to detecting a disconnect in the remote network connection with the second computer, the remote network connection with the second computer may be automatically recovered by restarting the remote network connection with the second computer based on information stored in the session log file at a point of the disconnect.

20 Claims, 3 Drawing Sheets

(56) References Cited

U.S. PATENT DOCUMENTS

| | | | |
|---|---|---|---|
| 2008/0195750 A1* | 8/2008 | Sadovsky | G06F 21/78 709/234 |
| 2011/0276697 A1* | 11/2011 | Baratakke | H04L 67/06 709/227 |
| 2013/0304742 A1* | 11/2013 | Roman | G06F 17/30598 707/740 |
| 2014/0143264 A1 | 5/2014 | Runcie | |

OTHER PUBLICATIONS

"Stderr and Stdout of SSH?", Stackoverflow.com, Mar. 2, 2013 [retrieved on Feb. 10, 2017]. Retrieved from the Internet: <URL:http://stackoverflow.com/questions/15172250/stderr-and-stdout-of-ssh>.*

"Tail(1) Linux man page", Die.net, Nov. 9, 2014 [retrieved on Feb. 10, 2017]. Retrieved from the Internet: <URL:https://web.archive.org/web/20141109154236/http://linux.die.net/man/1/tail>.*

"Autossh(1) Linux man page", Die.net, Nov. 16, 2014 [retrieved on Feb. 10, 2017]. Retrieved from the Internet: <URL:https://web.archive.org/web/20141116010751/http://linux.die.net/man/1/autossh>.*

Keating, J. "Persistent SSH Connections with Context!", DerpOps and Bikes, Sep. 5, 2014 [retrieved on Feb. 10, 2017]. Retrieved from the Internet: <URL:https://derpops.bike/2014/09/05/persistent-ssh-connections-with-context/>.*

"Execute remote commands, completely detaching from the ssh connection", archive.org, May 2, 2013 [retrieved on Jun. 13, 2017]. Retrieved from the Internet: <URL:https://web.archive.org/web/20130521075653/https://unix.stackexchange.com/questions/30400/execute-remote-commands-completely-detaching-from-the-ssh-connection>.*

Pokhilko, E. "Run a bash script with sudo, nohup and in the background", Evgeny Pokhilko's Weblog, Feb. 20, 2012 [retrieved on Jun. 13, 2017]. Retrieved from the Internet: <URL:https://evpo.wordpress.com/2012/02/20/run-a-bash-script-with-sudo-nohup-and-in-the-background/>.*

Winstein, K. et al. "Mosh: A State-of-the-Art Good Old-Fashioned Mobile Shell", ;login: Magazine, vol. 37, No. 4, Aug. 2012 [retrieved on Jan. 2, 2018]. pp. 20-27. Retrieved from the Internet: <URL:https://www.usenix.org/system/files/login/articles/winstein.pdf>.*

"Tmux", Wikipedia, last modified on Sep. 3, 2014, 3 pages, http://en.wikipedia.org/wiki/Tmux.

"Secure Shell", Wikipedia, last modified on Nov. 4, 2014, 11 pages, http://en.wikipedia.org/wiki/Secure_Shell.

"Nohup", Wikipedia, last modified on Oct. 9, 2014, 3 pages, http://en.wikipedia.org/wiki/Nohup.

* cited by examiner

DISCONNECT PROTECTION FOR COMMAND-LINE REMOTE TERMINALS

FIELD

The present application relates generally to computers, and computer applications, and more particularly to protecting disconnections in command-line remote terminals.

BACKGROUND

Command-line remote terminals such as secure shell (SSH) and Telnet are widely used for system administration, especially as Linux and cloud environments see increasing automation and remoteability. Briefly, Telnet is a network protocol that provides a communication capability with a remote computer, e.g., command-line interface to a remote computer or remote computer's operating system. SSH is another network protocol that provides for command-line interface to a remote computer securely. Unlike graphical remote desktop applications, command-line connections lose processes and command output when the session disconnects. Long-lived commands such as a product installation running over SSH are particularly vulnerable.

In a simple example, a developer may use SSH to run an installation on a remote machine and move the remote machine to another location, which may trigger a brief wireless network disconnect. In this case, the installation will terminate and leave the product in a potentially broken state. Even if using a remote terminal that does not cause process termination, the user would lose their process connection.

BRIEF SUMMARY

A method and system of providing disconnection protection for command-line remote terminal may be provided. The method, in one aspect, may comprise establishing a remote network connection with a second computer, by a remote connection interface running on a first computer, to emulate a terminal at the second computer. The method may also comprise creating, by the remote network connection interface, a command-line remote terminal session at the first computer for interacting with the second computer. The method may further comprise intercepting, by the remote connection interface, a command entered in the command-line remote terminal session. The method may also comprise injecting, by the remote connection interface, a disconnect protection into the command, the disconnect protection comprising at least redirecting output from the command into a session log file. The method may also comprise tracking, by the remote connection interface, the output of the command having the disconnect protection to simulate the command as an active process in the command-line remote terminal session at the first computer. The method may further comprise responsive to detecting a disconnect in the remote network connection with the second computer, automatically recovering, by the remote connection interface, the remote network connection with the second computer by restarting the remote network connection with the second computer based on information stored in the session log file at a point of the disconnect.

A system for providing disconnection protection for command-line remote terminal, in one aspect, may comprise a first computer coupled to a network. A remote connection interface may run on the first computer to emulate a terminal at a second computer. The remote connection interface may be operable to establish a remote network connection with the second computer. The remote connection interface may be further operable to create a command-line remote terminal session at the first computer for interacting with the second computer. The remote connection interface may be further operable to intercept a command entered in the command-line remote terminal session and inject a disconnect protection into the command, the disconnect protection comprising at least redirecting output from the command into a session log file. The remote connection interface may be further operable to track the output of the command having the disconnect protection to simulate the command as an active process in the command-line remote terminal session at the first computer. Responsive to detecting a disconnect in the remote network connection with the second computer, the remote connection interface may be further operable to automatically recover the remote network connection with the second computer by restarting the remote network connection with the second computer based on information stored in the session log file at a point of the disconnect.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Techniques are disclosed that can maintain and recover command-line remote terminal sessions automatically, e.g., without a user needing to enter additional commands or to know in advance of a command-line remote network session to add protections. For example, if a user's network connection is normally stable, that user would not likely have started a tool for disconnect protection. In those cases, when unexpected network failure occurs or an unexpected need arises to move locations where there may be temporary lose of a connection, the user's session would not be recoverable. Techniques of the present disclosure also may place a less burden on the user to remember and to manually start a protection tool in advance of a session.

The techniques of the present disclosure may provide an enhanced terminal client that handles a network protocol like SSH or Telnet. In one embodiment, the client may include the following enhancements over the existing protocol capability. The client is able to automatically launch commands using disconnect protection such as 'Nohup' and '&' commands on Linux, and redirect logs. Briefly, '&' commands run as background processes. The client may 'tail' the redirected logs to simulate an active process. The client may track the number of lines written to be able to recover from the same line number. The client may track user 'sessions' that the user can create. If the connection gets broken, the user can reconnect using that 'session' and is able see logs and activity from the point of failure.

A layer of functionality may be added to exiting command-line remote terminal client applications. Such client layer may automatically run processes in the background and redirect logs, track log output to simulate remote client sessions, and recover connections by restarting logs at the point of the broken connection. A background process executes without user intervention, independently of the command line or the shell, leaving the terminal free for other work.

Figure 1:
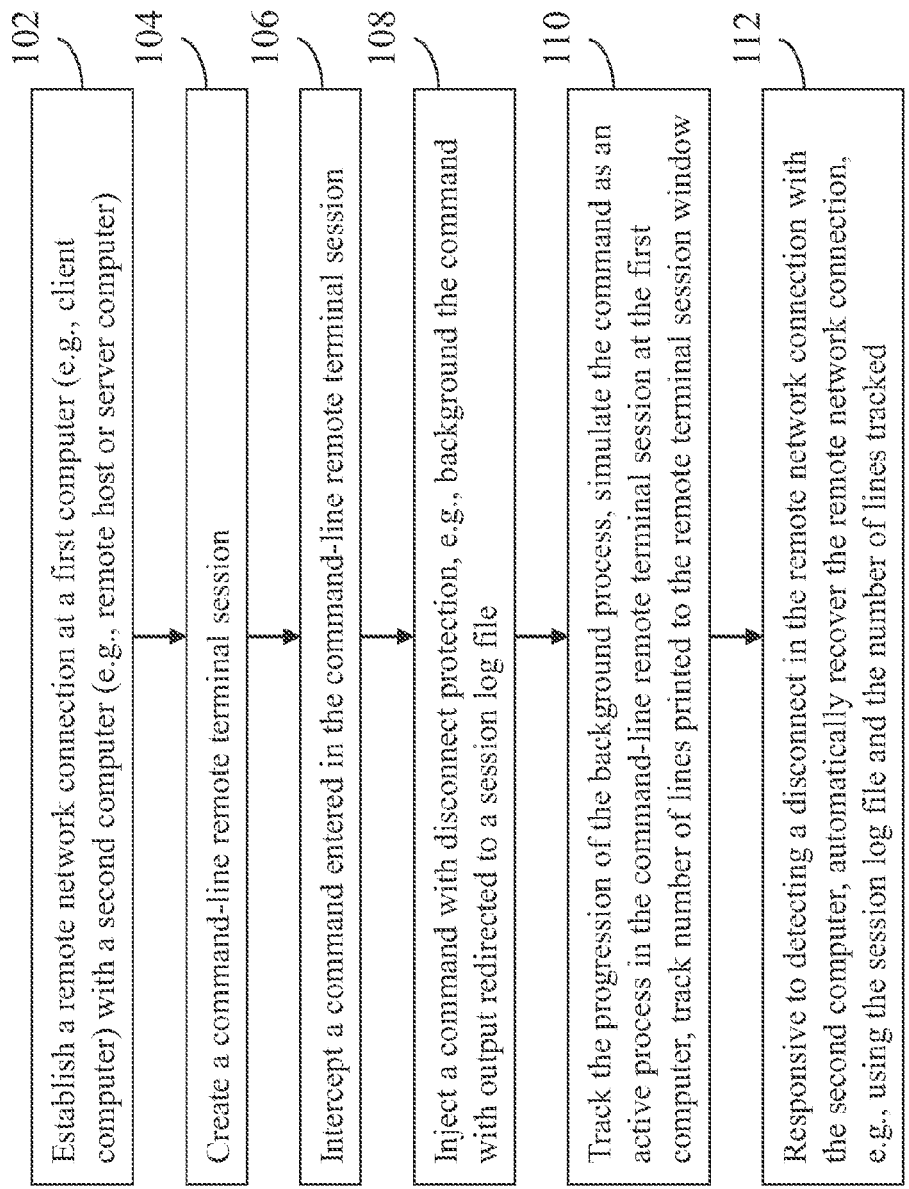
FIG. 1 is a flow diagram illustrating a method of automatically protecting disconnections occurring in command-line remote terminal sessions in one embodiment of the present disclosure.

FIG. 1 is a flow diagram illustrating a method of automatically protecting disconnections occurring in command-line remote terminal sessions in one embodiment of the present disclosure. At 102, a remote network connection is established at a first computer (e.g., client computer) with a second computer (e.g., remote host or server computer) by a remote network connection interface running on the first computer. For example, a remote network connection interface or utility may be provided to run on a client computer and handle protocols such as SSH or Telnet used to establish remote command-line terminal sessions. The remote network connection interface is enhanced with capabilities to automatically protect such a remote command-line terminal session in cases of disconnections in the remote network connection.

At 104, a command-line remote terminal session may be created by the remote network connection interface at the first computer (e.g., client) for interacting with the second computer (e.g., host). For instance, a user may run or invoke the remote network connection interface to establish a remote network connection and create a client session. In one aspect, the user may input or specify a name or identifier for the session being created, for example, "Session A." A user may also select a client session when loading or running the remote network connection interface.

Once a connection is established and a client session is created, a user may enter and run commands on the command-line of the remote terminal session. For example, a user may run "productInstall" on the command line. At 106, the remote connection interface intercepts a command entered in the command-line remote terminal session, and instead injects a command with disconnect protection at 108. The command with disconnect protection may be a command to run the user entered original command as a background process with the output redirected to another file descriptor, for example redirected to a session log file. A modified command injected with a disconnect protection, for example, may look like: "nohup productInstall & >/sessiona.log 2>&1". Briefly, 'nohup' operating system command runs a specified command (in this example, 'productInstall') ignoring hangup signals. The '&' sign appearing after the command in the command line indicates to the operating system to run the command as a background process. The '>' sign appearing in the command line redirects output. The above example instructs the operating system to redirect the output from running 'productInstall' to a file named '/sessiona.log'. The command also instructs the operating system to make the standard error (file descriptor 2) go to the same place as the standard output (2>&1). Hence, in the above example, standard output and error are redirected to "/sessiona.log" file. In Unix or Linux operating system shells, the file descriptors for stdin, stdout, and stderr are 0, 1, and 2, respectively.

The command with injected disconnect protection is communicated to the second computer (e.g., host) to run, and the second computer runs the command, for example as a background process, redirecting the output to the specified output file. For instance, as described above, a command a user typed or entered (e.g., "productInstall") may be intercepted, and instead an instruction to run the command as a background process with redirected output (e.g., "nohup productInstall >/sessiona.log 2>&1") may be sent to the server or host computer to run. In addition, a command for tracking the log file, e.g., "tail -f/sessiona.log" may be sent to the server or host computer to run. In one aspect, the remote connection interface may also echo the "productInstall" text to the user, e.g., that the user is not aware that the command the user has entered has been intercepted and different command has been sent to the server or host computer. Rather, the user may see the command being run as entered by the user.

At 110, the remote connection interface tracks the progression of the background process, e.g., by tracking the output written to the session log file to simulate the command as an active process in the command-line remote terminal session at the first computer. For example, the remote connection interface outputs data from the session log file to the command-line remote terminal session at the first computer, e.g., simulating the command as an active foreground process. Lines of data from the session log file may be printed on a console or a terminal that is running the command-line remote terminal session. For instance, the remote connection interface may tail the command after kicked off by running a corresponding command "tail -f/sessiona.log", which effectively streams the file contents as the file grows. The "-f" option for the tail command automatically prints updates as the file grows.

The tail command or like command may be run in another session or the same session. For example, when the command is initially run by the user, the tail command may be run from the same session. If the user gets disconnected and logs in again, e.g., because of a lost network connection, the user may log in using a new session and the new tail command may effectively gets run from a different session. The tail command or the like command for tracking output may be run as a foreground process at the server or host computer, for example, as long as the original process executes. In one embodiment, another process such as a client-side agent (e.g., part of the remote connection interface functionality) may detect or determine when the original command (running as a background process) terminates. Responsive to determining that the original command has finished running, the tracking command (e.g., tail command) also terminates. For instance, the client-side agent or the remote connection interface may kill or stop the process that is running tracking command.

In another aspect, the remote connection interface may track the number of lines that are printed to the console, to know how far the session log file is read, and store that line number in client session data that is associated with this command-line remote terminal session. For example, as a line is read from the output file and printed on the console or session window at the client computer, the number of lines read may be stored in a data file or like associated with this session as client session data. The client session data may be stored on the client computer that is running the remote connection interface.

If the network connection is lost, the remote terminal will disconnect. That is, the command-line remote terminal session will disconnect and terminate. The tracking process run in the foreground as an active process, for example, the tail command, will also terminate as a result of the disconnection. However, the original command running as a background process will continue to run in the server or host computer. For example, the original command executed with 'nohup' will continue to run.

Responsive to detecting a disconnect in the remote network connection with the second computer, at 112, the remote connection interface automatically recovers the remote network connection with the second computer by restarting the remote network connection with the second computer based on information stored in the session log file. In one aspect, the remote network connection is restarted at a point of the disconnect, for example, using the tracked line number stored in the client session data. The remote connection interface resumes tailing the 'sessiona.log' file from the line number where the disconnect took place. For instance, the tail command has an "-n" option to display the last X number of lines, which can be used to recover the log data from the desired point. Execution of the command and the session continues normally. For example, the host computer is still outputting data to the log file while the user is disconnected. The remote connection interface at the client computer is able to recover at the point of disconnect by knowing the number of lines the user saw, that is, last printed to the session window or console before the disconnection occurred. For example, if there were 50 lines printed (e.g., the user sees 50 lines), and the terminal session disconnected, and if the users then logs back in and the log file has grown to 150 lines, then the remote connection interface may run a command such as "tail -n 100 -f/sessiona.log" to print or show the user the 100 lines lost during the disconnect, and to continue streaming.

In one aspect, to reconnect to the remote terminal, a user may select a session that was previously running, for example, "Session A." For instance, the remote connection interface may restart by asking a user to select a session, and responsive to a user selecting a session, the remote connection interface may start and resume a disconnected session. In another aspect, the remote connection interface may automatically select a session and restart, e.g., the session that was last running.

In one aspect, a methodology of the present disclosure allows interactive input. For example, if the user enters input for a running command, the remote connection interface may capture the input and foreground the main process to enter the input. As an example, if the user starts typing input for the original process (e.g., "productInstall" command), to communicate or transmit that input to the original process, the remote connection interface may change the original command that is running as a background process to run as a foreground process for input processing. For instance, an "fg" command or like operating system utility may be used to foreground a process. In one aspect, the process that is tailing or tracking the log may be changed to a background process while the original command is run as a foreground process. In another embodiment, to allow interactive input, another technique such as providing a hotkey for the user to undo the injected disconnect protection may be utilized to allow the user to operate the original command as entered.

In another aspect, if the user kills the running command, for example, by typing in control C (^C), the remote connection interface may also foreground the main process for the input. This way the kill command is sent to the command that was running as a background process.

Yet in another aspect, if the user entered command is a command to run in background (e.g., the user enters 'command_name &' manually), the remote connection interface may background the tailing of the log command. For example, the output of the background process is redirected to a log file as described above, and the remote connection interface may run the tail command in the background. The output of the tracking process (e.g., tail command) is printed on the console or session window, and may be displayed intermixed with output from another process a user might be currently running.

Still in another aspect, the remote connection interface may optionally store user credentials for automatic reconnection. For example, user identifier (ID) and password the user initially entered while connecting to the system may be stored as credentials and used in reconnection. For example, command-line remote terminal utilities such as SSH may require an user ID and password for starting a session. The remote connection interface of the present disclosure in one embodiment may use the stored user credentials to automatically log back to restore a session after a disconnect, e.g., automatically injects the user ID and password in creating a session. From a user's point of view, automatic recovery occurs without the user needing to recreate the session. In cases in which a user may have configured login without credentials (based on public keys), for example, the remote connection interface at a client computer may reconnect without needing to store or use a password.

Figure 2:
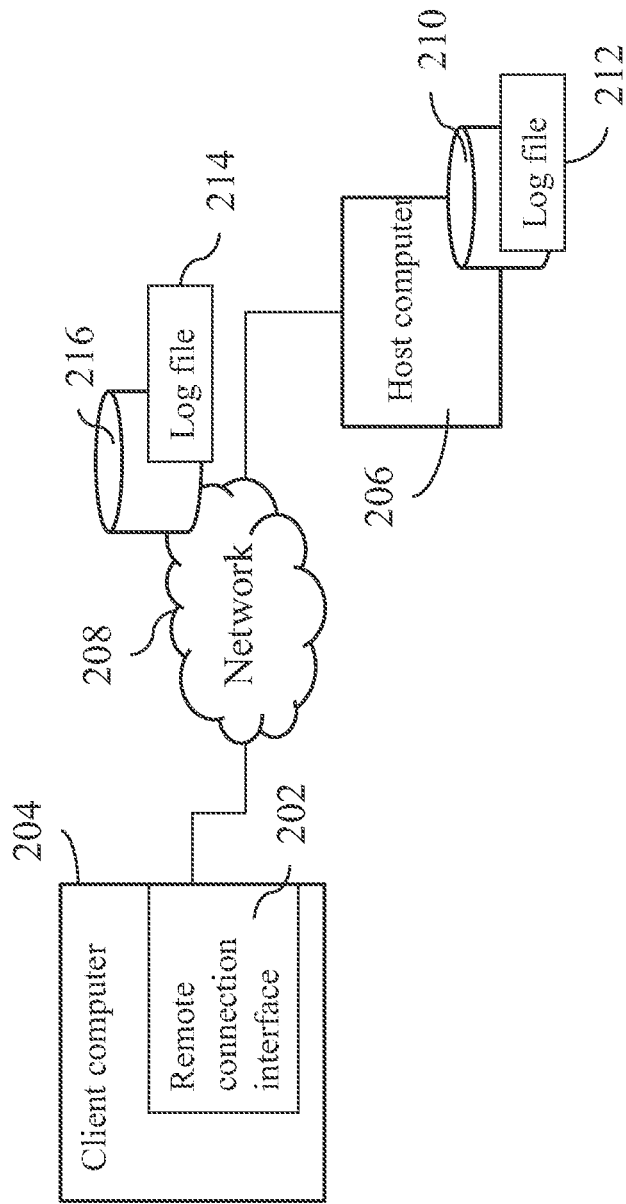
FIG. 2 is a diagram illustrating an overview of a system for providing disconnection protection for command-line remote terminal in one embodiment of the present disclosure.

FIG. 2 is a diagram illustrating an overview of a system for providing disconnection protection for command-line remote terminal in one embodiment of the present disclosure. A remote connection interface 202 may run on a first computer 204 coupled to a network 208 to emulate a terminal at a second computer 206. For instance, the first computer may function as a client and the second computer may function as a server or host. The remote connection interface 202 may establish a remote network connection with the second computer as described above with reference to FIG. 1. The remote connection interface 202 may also create a command-line remote terminal session at the first computer for interacting with the second computer, for example, as described above with reference to FIG. 1. The remote connection interface may further intercept a command entered in the command-line remote terminal session and inject a disconnect protection into the command, for example, as described above with reference to FIG. 1. The remote connection interface 202 may further track the output written to the session log file to simulate the command as an active process in the command-line remote terminal session at the first computer 204, for example, as described above with reference to FIG. 1. Responsive to detecting a disconnect in the remote network connection with the second computer 206, the remote connection interface 202 may automatically recover the remote network connection with the second computer 206 by restarting the remote network connection with the second computer 206 based on information stored in the session log file at a point of the disconnect. The session log file may be stored in a storage device accessible by the second computer 206, for example, where the second computer running the command can write its output. In one aspect, the log file 212 may be stored with the second computer 206, e.g., in a storage 210 local to the second computer 206. In another aspect, the log file 214 may be stored with the second computer 206 in a storage accessible by the second computer 206, e.g., remote network storage 216.

Figure 3:
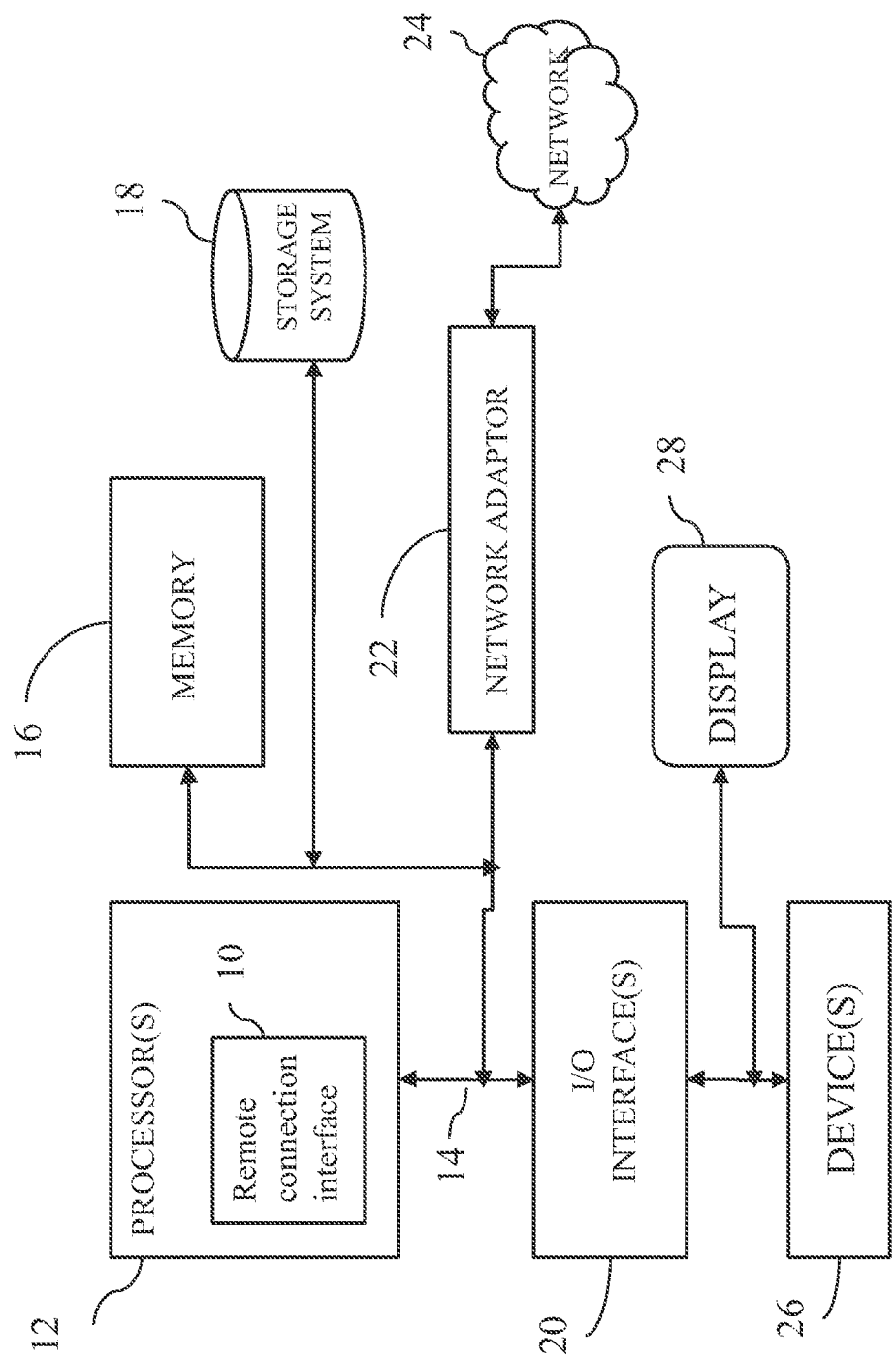
FIG. 3 illustrates a schematic of an example computer or processing system that may implement a disconnect protection system for command-line remote terminal in one embodiment of the present disclosure.

FIG. 3 illustrates a schematic of an example computer or processing system that may implement the disconnect protection system for command-line remote terminal in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of providing disconnection protection for command-line remote terminal, comprising:
   establishing a remote network connection with a second computer, by a remote connection interface running on a first computer, to emulate a terminal at the second computer;
   creating, by the remote network connection interface, a command-line remote terminal session at the first computer for interacting with the second computer;
   intercepting, by the remote connection interface, a command entered in the command-line remote terminal session, the command to be executed at the second computer;
   injecting, by the remote connection interface, a disconnect protection into the command, wherein the command to be executed at the second computer is modified as a background process with redirection of the background process's output to a session log file;

communicating the modified command in lieu of the command entered in the command-line remote terminal session to the second computer to execute;

simulating execution of the command as an active process in the command-line remote terminal session at the first computer by tracking, by the remote connection interface, the output of the background process and displaying a tail part of the session log file to a command-line remote terminal session window at the first computer;

responsive to detecting a disconnect in the remote network connection with the second computer, automatically recovering, by the remote connection interface, the remote network connection with the second computer by restarting the remote network connection with the second computer based on information stored in the session log file at a point of the disconnect, wherein the simulating of the execution of the command continues as an active process in the command-line remote terminal session at the first computer, wherein the tracking the output of the background process further comprises keeping track of data printed from the session log file.

2. The method of claim 1, wherein the injecting a disconnect protection into the command comprises modifying the command as a background process and redirecting output from the command into a session log file.

3. The method of claim 1, wherein the keeping track of data printed from the session log file comprises keeping track of a number of lines printed from the session log file to the command-line remote terminal session window at the first computer.

4. The method of claim 3, wherein the restarting the remote network connection with the second computer based on information stored in the session log file at a point of the disconnect comprises printing the session log file from a last printed line before the disconnect in the remote network connection.

5. The method of claim 1, wherein the remote connection interface supports a terminal client comprising one or more of SSH and Telnet.

6. The method of claim 1, wherein the automatically recovering the remote network connection comprises automatically recovering the command-line remote terminal session selected by a user.

7. The method of claim 1, wherein tracking is performed as a background process if the command is entered as a background process.

8. The method of claim 1, wherein the command-line remote terminal session is maintained and recovered automatically without a user needing to enter an additional command in advance of the command-line remote session to add protection, and the background process executes without the user intervention, independently of a command line of the command-line remote terminal session.

9. A system for providing disconnection protection for command-line remote terminal, comprising:

a first computer coupled to a network; and a remote connection interface running on the first computer to emulate a terminal at a second computer;

the remote connection interface operable to establish a remote network connection with the second computer, the remote connection interface further operable to create a command-line remote terminal session at the first computer for interacting with the second computer, the remote connection interface further operable to intercept a command entered in the command-line remote terminal session, the command to be executed at the second computer, and inject a disconnect protection into the command, wherein the command to be executed at the second computer is modified as a background process with redirection of the background process's output to a session log file, wherein the modified command is communicated in lieu of the command entered in the command-line remote terminal session to the second computer to execute;

the remote connection interface further simulating execution of the command as an active process in the command-line remote terminal session at the first computer by tracking the output of the background process and displaying a tail part of the session log file to a command-line remote terminal session window at the first computer, responsive to detecting a disconnect in the remote network connection with the second computer, the remote connection interface further operable to automatically recover the remote network connection with the second computer by restarting the remote network connection with the second computer based on information stored in the session log file at a point of the disconnect, wherein the simulating of the execution of the command continues as an active process in the command-line remote terminal session at the first computer, wherein the tracking the output of the background process further comprises keeping track of data printed from the session log file.

10. The system of claim 9, wherein the remote connection interface injects a disconnect protection into the command by modifying the command as a background process with output from the command redirected to a session log file.

11. The system of claim 9, wherein the remote connection interface keeps track of a number of lines printed from the session log file.

12. The system of claim 11, wherein the remote connection interface restarts the remote network connection with the second computer based on information stored in the session log file at a point of the disconnect by printing the session log file from a last printed line before the disconnect in the remote network connection.

13. The system of claim 9, wherein the remote connection interface supports a terminal client comprising one or more of SSH and Telnet.

14. The system of claim 9, wherein the remote connection interface runs a background tracking process to track the output written to the session log file, if the command is entered as a background process.

15. The system of claim 9, wherein the command-line remote terminal session is maintained and recovered automatically without a user needing to enter an additional command in advance of the command-line remote session to add protection, and the background process executes without the user intervention, independently of a command line of the command-line remote terminal session.

16. A computer readable storage medium storing a program of instructions executable by a machine to perform a method of providing disconnection protection for command-line remote terminal, comprising:

establishing a remote network connection with a second computer, by a remote connection interface running on a first computer, to emulate a terminal at the second computer;

creating, by the remote network connection interface, a command-line remote terminal session at the first computer for interacting with the second computer;

intercepting, by the remote connection interface, a command entered in the command-line remote terminal session, the command to be executed at the second computer;

injecting, by the remote connection interface, a disconnect protection into the command, wherein the command to be executed at the second computer is modified as a background process with redirection of the background process's output to a session log file;

communicating the modified command in lieu of the command entered in the command-line remote terminal session to the second computer to execute;

simulating execution of the command as an active process in the command-line remote terminal session at the first computer by tracking, by the remote connection interface, the output of the background process and displaying a tail part of the session log file to a command-line remote terminal session window at the first computer;

responsive to detecting a disconnect in the remote network connection with the second computer, automatically recovering, by the remote connection interface, the remote network connection with the second computer by restarting the remote network connection with the second computer based on information stored in the session log file at a point of the disconnect, wherein the simulating of the execution of the command continues as an active process in the command-line remote terminal session at the first computer, wherein the tracking the output of the background process further comprises keeping track of data printed from the session log file.

17. The computer readable storage medium of claim 16, wherein the injecting a disconnect protection into the command comprises modifying the command as a background process and redirecting output from the command into a session log file.

18. The computer readable storage medium of claim 16, wherein the keeping track of data printed from the session log file comprises keeping track of a number of lines printed from the session log file to the command-line remote terminal session window at the first computer.

19. The computer readable storage medium of claim 18, wherein the restarting the remote network connection with the second computer based on information stored in the session log file at a point of the disconnect comprises printing the session log file from a last printed line before the disconnect in the remote network connection.

20. The computer readable storage medium of claim 16, wherein the command-line remote terminal session is maintained and recovered automatically without a user needing to enter an additional command in advance of the command-line remote session to add protection, and the background process executes without the user intervention, independently of a command line of the command-line remote terminal session.

* * * * *